United States Patent
Dölker (10) Patent No.: US 8,100,096 B2
(45) Date of Patent: Jan. 24, 2012

(54) METHOD FOR AUTOMATICALLY CONTROLLING AN INTERNAL COMBUSTION ENGINE

(75) Inventor: Armin Dölker, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 722 days.

(21) Appl. No.: 12/313,725

(22) Filed: Nov. 24, 2008

(65) Prior Publication Data
US 2009/0143957 A1    Jun. 4, 2009

(30) Foreign Application Priority Data
Nov. 22, 2007   (DE) .................... 10 2007 056 360

(51) Int. Cl.
*F01P 7/14*    (2006.01)
*F02B 33/00*   (2006.01)
(52) U.S. Cl. ............... 123/41.08; 123/542; 123/563
(58) Field of Classification Search ...... 123/41.08–41.1, 123/41.33, 542, 563
See application file for complete search history.

(56) References Cited

FOREIGN PATENT DOCUMENTS

| DE | 10215262 | 10/2003 |
|---|---|---|
| DE | 10223686 | 12/2003 |
| DE | 10228355 | 1/2004 |
| DE | 20122420 | 8/2005 |
| DE | 102007047089 | 10/2007 |

OTHER PUBLICATIONS

Schiff & Hafen/Kommandobrücke, *MTU—Baureihe 396 mit Mischfreislauf*, No. 1, 1990, pp. 49-50.

*Primary Examiner* — Noah Kamen
(74) *Attorney, Agent, or Firm* — Lucas & Mercanti, LLP; Klaus P. Stoffel (57) ABSTRACT

The invention concerns a method for automatically controlling an internal combustion engine, wherein, in a first controller mode, a charge air temperature controller is set as dominant for a map-controlled thermostatic valve, and, in a second controller mode, a coolant temperature limit controller is set as dominant for the map-controlled thermostatic valve. Upstream of a recooler, a coolant flow is divided into a recooler coolant flow and a bypass coolant flow as a function of the position of the map-controlled thermostatic valve. Downstream of the recooler, the temperature of the charge air cooler coolant flow is determined from the combined fractions of the recooler coolant flow and the bypass coolant flow to control the charge air temperature (TLL) or to control the coolant temperature (TKM).

10 Claims, 6 Drawing Sheets

METHOD FOR AUTOMATICALLY CONTROLLING AN INTERNAL COMBUSTION ENGINE

BACKGROUND OF THE INVENTION

The invention concerns a method for automatically controlling an internal combustion engine, in which, in a first controller mode, a charge air temperature controller is set as dominant for a map-controlled thermostatic valve, and, in a second controller mode, a coolant temperature limit controller is set as dominant for the map-controlled thermostatic valve. Furthermore, upstream of a recooler, a coolant flow is divided into a recooler coolant flow and a bypass coolant flow as a function of the position of the map-controlled thermostatic valve, and downstream of the recooler, the temperature of the charge air cooler coolant flow is determined from the combined fractions of the recooler coolant flow and the bypass coolant flow to control the charge air temperature or to control the coolant temperature.

A cooling circulation system of an internal combustion engine is known from the journal Schiff & Hafen/Kommandobrücke, No. 1, 1990, pp. 49-50. The cooling circulation consists of a high-temperature circuit with a coolant pump and a low-temperature circuit that branches off from the high-temperature circuit. In the low-temperature circuit, a thermostatic valve, a recooler with a bypass line, a charge air cooler, and a lubricating oil heat exchanger are arranged in series. The coolant flow in the low-temperature circuit diverted from the high-temperature circuit is divided by the position of the thermostatic valve into a recooler coolant flow, which flows through the recooler, and a bypass coolant flow. Downstream of the recooler, the two coolant flows are brought together again and fed to the charge air cooler as the charge air cooler coolant flow. The thermostatic valve thus determines the temperature of the charge air cooler coolant flow via the distribution of the coolant flow. The temperature of the charge air cooler coolant flow in turn defines, via the temperature difference from the charge air temperature, the amount of heat extracted from the charge air in the charge air cooler. For example, when the internal combustion engine is under full load, the thermostatic valve is completely open, so that the entire coolant flow of the low-temperature circuit flows through the recooler, and therefore the greatest possible amount of thermal energy is extracted from the charge air. By contrast, when the internal combustion engine is idling, the thermostatic valve is completely closed, so that the entire coolant flow of the low-temperature circuit flows through the bypass line, and very little thermal energy is extracted from the charge air. The switching state of the thermostatic valve is determined by a thermostatic operating element, for example, an expanding material element, which expands with increasing temperature of the coolant flow, so that the thermostatic valve opens, or contracts with decreasing temperature of the coolant flow, so that the thermostatic valve closes under spring tension. Due to the design of the thermostatic valve, automatic control of the charge air temperature is still not possible at all operating points.

DE 201 22 420 U1 discloses an electrically heated thermostatic valve in which the characteristic curve of the thermostatic operating element can be shifted by the electric control of the heating element. For example, when an internal combustion engine is cold, and a large load is demanded, the coolant flow can be influenced by the bypass line at an earlier time than would be possible by the thermostatic operating element alone. In the remainder of the text, a thermostatic valve of this type will be referred to as a map-controlled thermostatic valve. DE 102 23 686 A1 discloses a corresponding method for controlling this thermostatic valve. It describes two-position control with input control of the operating element. However, this method does not offer significant improvement with respect to the automatic control of the charge air temperature in the coolant circulation described above.

The unprepublished German patent application with the official file number DE 10 2007 047 089.6 describes a method for automatically controlling the charge air temperature over the entire operating range of the internal combustion engine. The charge air temperature is automatically controlled in its own closed-loop control system with a charge air temperature controller, which acts on the map-controlled thermostatic valve in the low-temperature circuit described above. In this closed-loop control system, the charge air temperature represents the controlled variable, and the bypass coolant flow to be set represents the correcting variable. The controlled system comprises the map-controlled thermostatic valve, the recooler with bypass line, and the charge air cooler.

If the charge air temperature is automatically controlled, the coolant temperature cannot also be automatically controlled to a predetermined value, but rather the coolant temperature in the low-temperature circuit and thus in the high-temperature circuit as well merely develops as a result. In the event of a rapid load application, for example, a rapid run-up, excessive temperature elevation can occur, especially in the charge air being cooled, as a consequence of excessively hot coolant. This causes increased wear of the parts of the internal combustion engine and can bring about a reduced service life.

SUMMARY OF THE INVENTION

The object of the invention is to protect the internal combustion engine from excessive increases in the coolant temperature while at the same time continuing to provide active automatic control of the charge air temperature.

This object is achieved by an automatic control method, in which, in a first controller mode, the charge air temperature controller is set as dominant for a map-controlled thermostatic valve, and, in a second controller mode, a coolant temperature limit controller is set as dominant for the map-controlled thermostatic valve. Furthermore, the method includes dividing a coolant flow upstream of a recooler into a recooler coolant flow and a bypass coolant flow as a function of the position of the map-controlled thermostatic valve and in determining the temperature of the charge air cooler coolant flow downstream of the recooler from the combined fractions of the recooler coolant flow and the bypass coolant flow to control the charge air temperature or to control the coolant temperature. The given controller whose correcting variable shows the smaller value is set as dominant for the map-controlled thermostatic valve. Basically, therefore, the controller which is dominant is the one which would be able to provide stronger cooling.

In the first controller mode, i.e., with the charge air temperature controller dominant, the actual charge air temperature is automatically controlled to the set charge air temperature. If the actual coolant temperature shows an impermissible increase, then the second correcting variable computed by the coolant temperature limit controller becomes smaller than the first correcting variable. This results in a change from the first controller mode to the second controller mode. In the second controller mode, the coolant temperature limit controller is dominant, i.e., the coolant temperature is controlled. To ensure that the transition from the first to the second controller mode is stable and has no discontinuities, when the charge air temperature controller is dominant, the I component of the coolant temperature limit controller is set to the value of the first correcting variable computed by the charge air temperature controller.

As a result of the fact that the coolant temperature limit controller intervenes in the charge air temperature control only when the coolant temperature exceeds an impermissible limit, the internal combustion engine is protected during transient events. An example of a transient event is the aforementioned rapid run-up. Since only one controller is ever dominant at a given time, a stable closed-loop control system is achieved.

Other features and advantages of the present invention will become apparent from the following description of the invention.

DETAILED DESCRIPTION OF THE INVENTION

Figure 1:
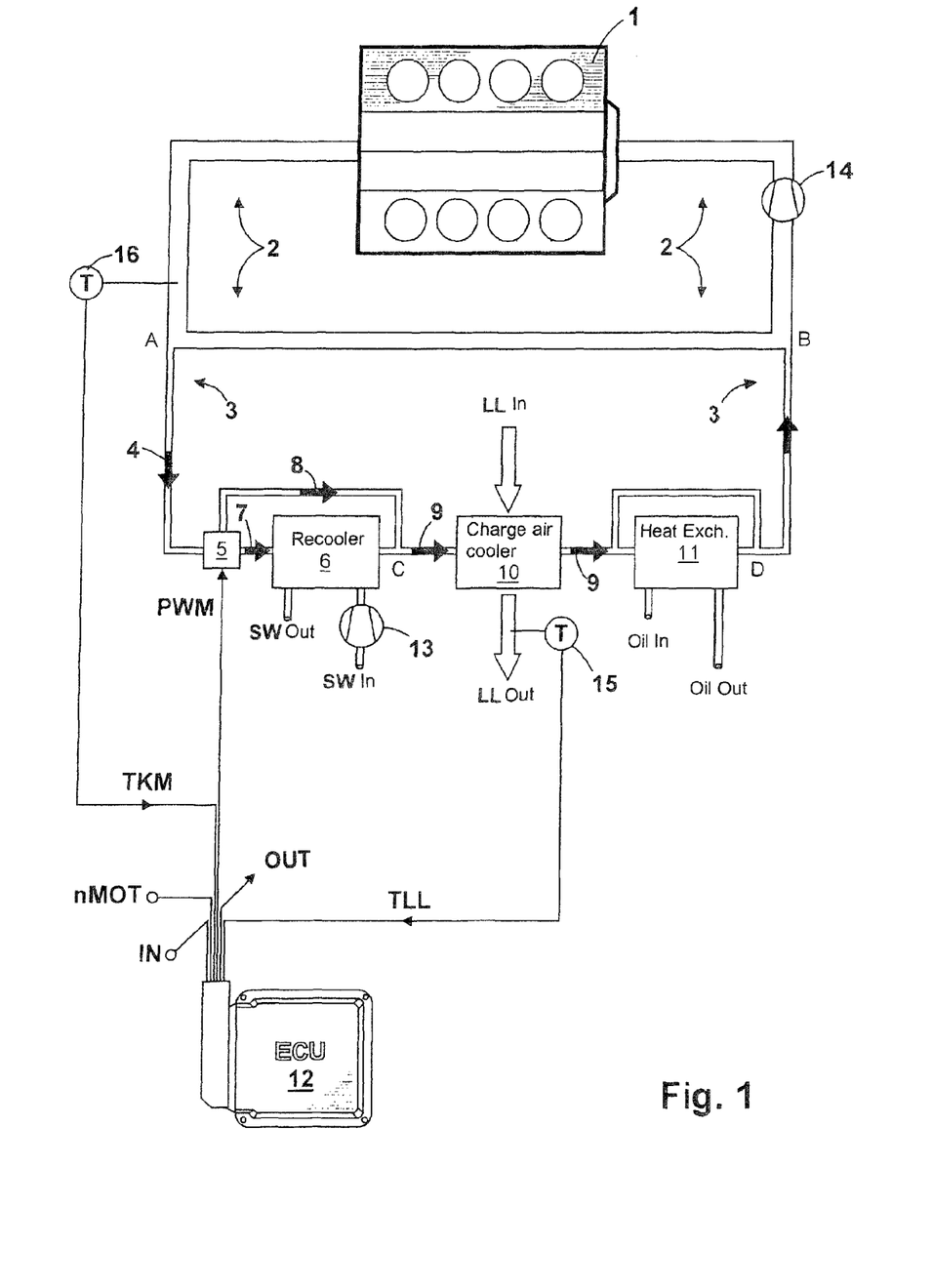
FIG. 1 shows a system diagram.

FIG. 1 shows a system diagram. The coolant circulation for cooling the internal combustion engine 1 comprises a high-temperature circuit 2 with a coolant pump 14 and a low-temperature circuit 3. The low-temperature circuit 3 branches off from the high-temperature circuit 2 at a point A and reenters the high-temperature circuit 2 at a point B. The coolant flow in the high-temperature circuit 2 and in the low-temperature circuit 3 is adjusted by a throttle point (not shown) in the high-temperature circuit 2. The coolant flow in the low-temperature circuit 3 after the split (point A) from the high-temperature circuit 2 is labeled in the drawing as coolant flow 4. A map-controlled thermostatic valve 5, a recooler 6 with a bypass line, a charge air cooler 10, and a lubricating oil heat exchanger 11 with a bypass line are arranged in series in the low-temperature circuit 3. The coolant flow 4 is distributed as a function of the position of the map-controlled thermostatic valve 5 to a recooler coolant flow 7 and/or a bypass coolant flow 8. When the map-controlled thermostatic valve 5 is completely closed, the entire coolant flow 4 is carried past the recooler 6 through the bypass line. When the map-controlled thermostatic valve 5 is completely open, the entire coolant flow 4 flows through the recooler 6. In the recooler 6, heat is transferred from the recooler coolant flow 7 to seawater, so that the recooler coolant flow 7 is cooled. The seawater is supplied by its own seawater pump 13. After it flows through the recooler 6, the seawater is returned. In FIG. 1, the seawater supply is denoted SW In and the seawater return is denoted SW Out.

At a point C, the recooler coolant flow 7 and the bypass coolant flow 8 are brought back together. This corresponds to the charge air cooler coolant flow 9, whose temperature is determined by the volume fractions and temperatures of the recooler coolant flow 7 and the bypass coolant flow 8. The charge air cooler coolant flow 9 then flows through the charge air cooler 10, in which heat is transferred from the charge air to the charge air cooler coolant flow 9, which causes strong cooling of the charge air. The charge air is supplied by the compressor of an exhaust gas turbocharger (not shown). After is flows through the charge air cooler 10, the charge air is supplied to the combustion chambers of the internal combustion engine 1. In FIG. 1, the charge air supply is denoted LL In and the charge air return is denoted LL Out. The heated charge air cooler coolant flow 9 then flows through the lubricating oil heat exchanger 11, in which heat is transferred from the lubricant to the charge air cooler coolant flow 9, thereby cooling the lubricant. In FIG. 1, the lubricant supply is denoted Oil In and the lubricant return is denoted Oil Out. A portion of the charge air cooler coolant flow 9 is conveyed past the lubricating oil heat exchanger 11 by a bypass line. At a point D, the two volumes are brought back together again, and the combined flow is then fed back into the high-temperature circuit 2 at point B.

Reference number 12 denotes an electronic engine control unit (ECU), which determines the behavior of the internal combustion engine 1. The electronic engine control unit 12 contains the usual components of a microcomputer system, for example, a microprocessor, interface adapters, buffers, and memory components (EEPROM, RAM). Operating characteristics that are relevant to the operation of the internal combustion engine 1 are applied in the memory components in the form of engine maps/characteristic curves. The electronic engine control unit 12 uses these to compute the output variables from the input variables. FIG. 1 shows the following input variables as examples: the engine speed nMOT, a charge air temperature TLL (raw values), which is measured by a temperature sensor 15, a (high-temperature circuit) coolant temperature TKM, which is measured by a temperature sensor 16, and an input variable IN. Examples of input variables IN are a rail pressure of the common rail system and a power demand made by an operator. As output variables of the electronic engine control unit 12, FIG. 1 shows a signal PWM for controlling the map-controlled thermostatic valve 5 and an output variable OUT. The output variable OUT is representative of additional control signals for the open-loop and closed-loop control of the internal combustion engine 1, for example, a control signal for the start or end of injection and a signal for controlling a suction throttle in a common rail system.

Figure 2:
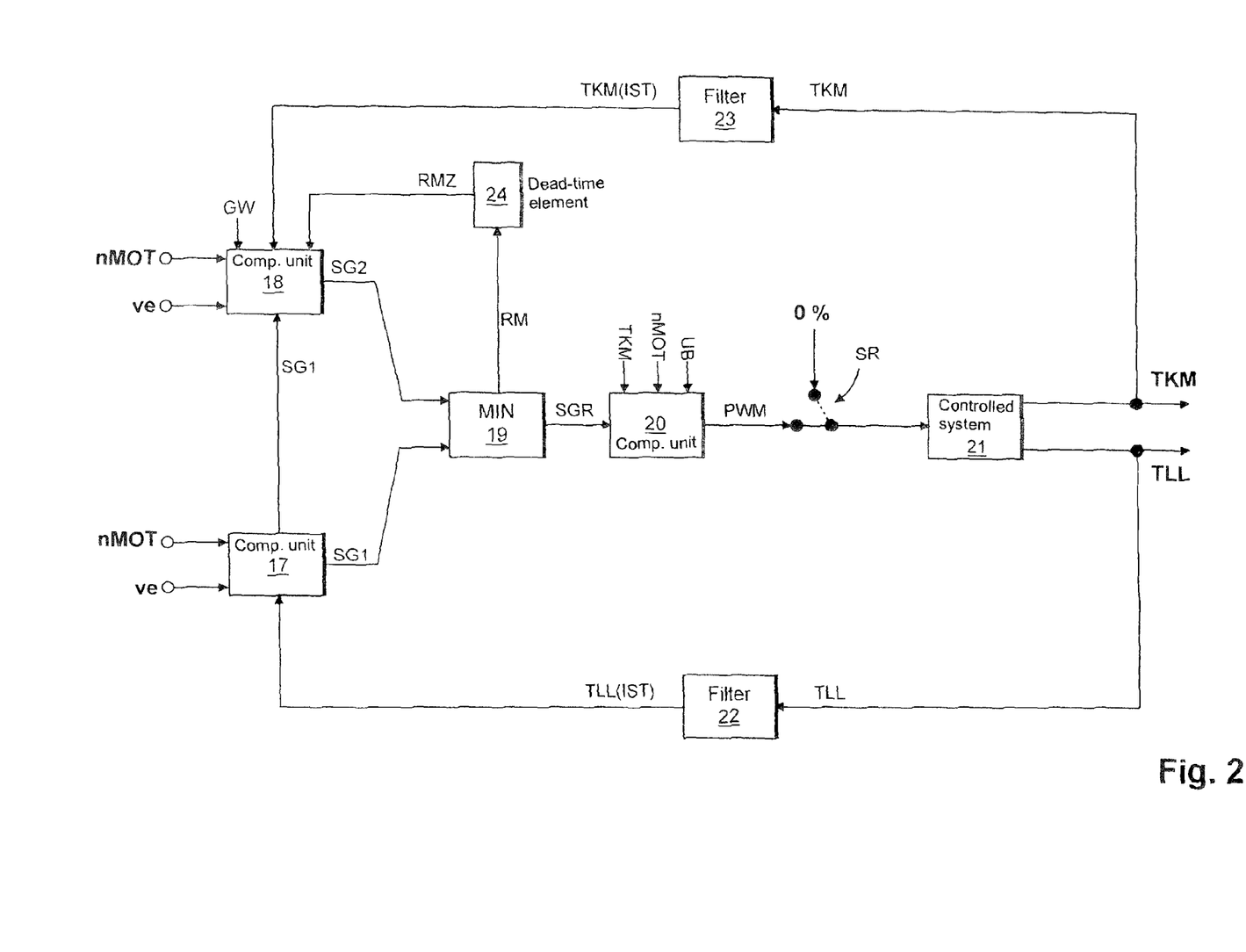
FIG. 2 shows a closed-loop system for automatic charge air or coolant temperature control.
Figure 3:
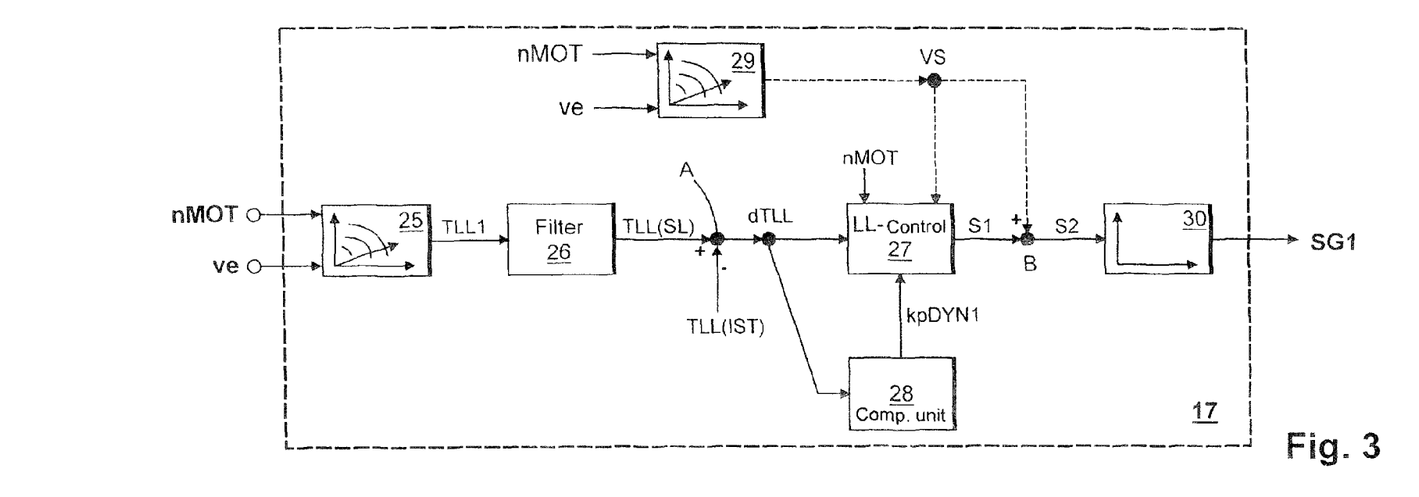
FIG. 3 shows a block diagram for the automatic charge air temperature control.
Figure 4:
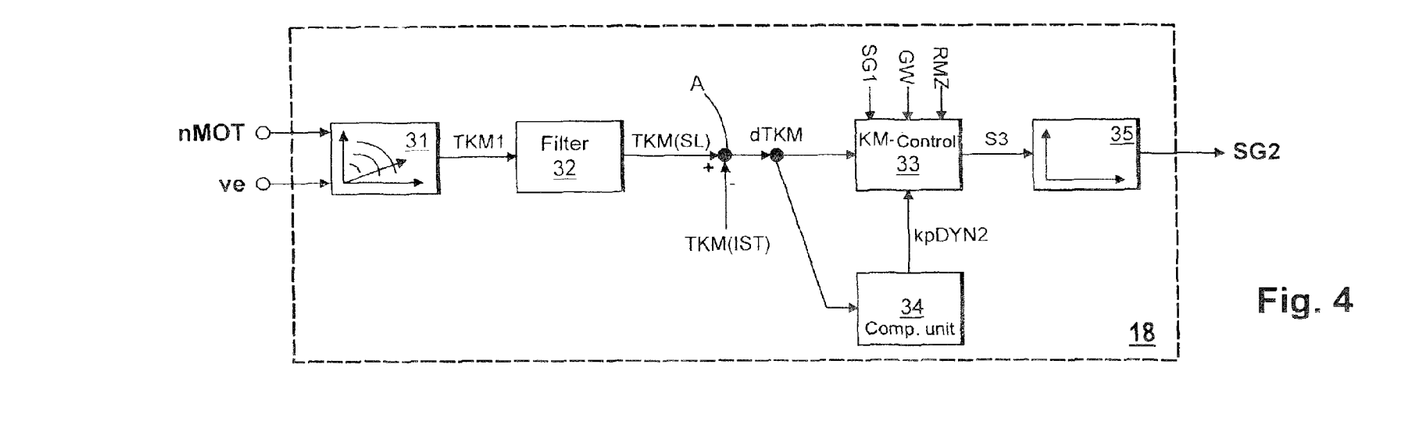
FIG. 4 shows a block diagram for the automatic coolant temperature control.
Figure 5:
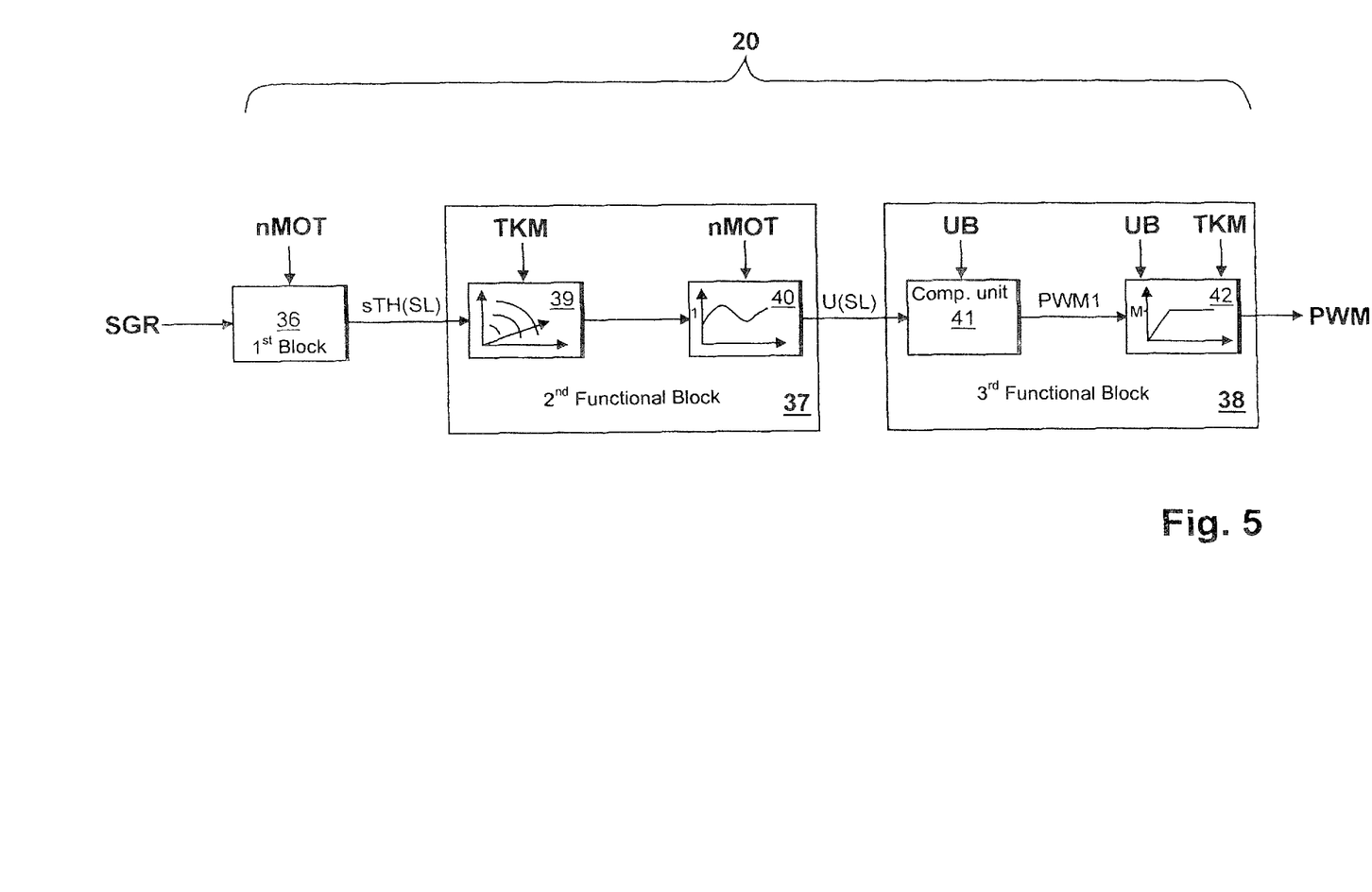
FIG. 5 shows a block diagram of the computing unit.

FIG. 2 shows a closed-loop control system for automatically controlling the charge air temperature or coolant temperature in the cooling circulation system of FIG. 1. The input variables of the closed-loop control system are the engine speed nMOT, a power-determining signal ve, a limiting value GW, and the battery voltage UB. The power-determining signal ve corresponds to a set torque in an automatic engine control system based on torque or to a set injection quantity in an automatic engine control system based on injection quantity. The output variables of the closed-loop control system are the charge air temperature TLL and the coolant temperature TKM. The elements of the closed-loop control system are: a computing unit 17 for determining a first correcting variable SG1, a computing unit 18 for determining a second correcting variable SG2, a minimum value selector 19, a computing unit 20, a switch SR, and the controlled system 21. The output variables of the controlled system 21 represent the controlled variables, which in this case are: the raw values of the charge air temperature TLL and the raw values of the (high-temperature circuit) coolant temperature TKM. The determination of the set charge air temperature, the determination of the charge air temperature control deviation, the charge air temperature controller, and a limiter are integrated in the computing unit 17. The computing unit 17 is shown in FIG. 3 as a block diagram and will be explained in connection with FIG. 3. The determination of the set coolant temperature, the determination of the coolant temperature control deviation, the coolant temperature limit controller, and a limiter are integrated in the computing unit 18. The computing unit 18 is shown in FIG. 4 as a block diagram and will be explained in connection with FIG. 4. The conversion of a resultant SGR into a control signal PWM is integrated in the computing unit 20. The control signal PWM acts on the map-controlled thermostatic valve 5 in the controlled system 21. The computing unit 20 is shown in FIG. 5 as a block diagram and will be explained in connection with FIG. 5. Either the control signal PWM (solid line) or the constant value 0% (broken line) in the case of engine shutdown is sent to the controlled system 21 via the switch SR. The controlled system 21 comprises the map-controlled thermostatic valve 5, the recooler 6 with bypass line, and the charge air cooler 10. The raw values of the charge air temperature TLL are filtered by an optional filter 22, which is incorporated in a first feedback path. The filtered values represent the actual charge air temperature TLL(IST), which is sent to the computing unit 17. The raw values of the coolant temperature TKM are filtered by an optional filter 23, which is incorporated in a second feedback path. The filtered values represent the actual coolant temperature TKM(IST), which is sent to the computing unit 17. The controller mode RM, delayed by a scanning step, is fed back via a dead-time element 24 to the computing unit 18 as a delayed controller mode RMZ. The controller mode RM stands for the first controller mode RM1 or the second controller mode RM2.

The illustrated closed-loop control system in the drawing has the following functionality:

The minimum value selector 19 sets that controller as dominant for the map-controlled thermostatic valve whose correcting variable shows the smaller value. Therefore, the controller which would be able to provide stronger cooling is the one which prevails. In normal operation, the first correcting variable SG1 is less than the second correcting variable SG2, i.e., the first controller mode RM1 is set. In this controller mode, the charge air temperature controller, which is integrated in the computing unit 17, is dominant. The minimum value selector 19 sets the resultant SGR to the value of the first correcting variable SG1. The computing unit 20 then uses the resultant SGR to compute the control signal PWM for acting on the map-controlled thermostatic valve. The recooler coolant flow, which flows through the recooler, and the bypass coolant flow are determined as a function of the position of the map-controlled thermostatic valve. However, if the actual coolant temperature TKM(IST) approaches a set coolant temperature until eventually it exceeds the set coolant temperature, the value of the second correcting variable SG2 falls below the value of the first correcting variable SG1. The minimum value selector 19 then sets the resultant SGR to the value of the second correcting variable SG2, and the second controller mode RM2 is set. The coolant temperature limit controller, which is integrated in the computing unit 18, then takes control via the map-controlled thermostatic valve. Only when the actual coolant temperature TKM(IST) has fallen back below the set coolant temperature due to strong cooling, can the charge air temperature controller again take control via the map-controlled thermostatic valve.

The following assignment thus applies for the resultant correcting variable, by which the bypass coolant flow to be set is ultimately determined:

The value of the resultant correcting variable SGR corresponds to the value of the first correcting variable SG1 when the value of the first correcting variable SG1 is less than or equal to the value of the second correcting variable SG2. If the value of the second correcting variable SG2 is less than the value of the first correcting variable SG1, then the value of the resultant correcting variable SGR corresponds to the value of the second correcting variable SG2.

The following applies to the controller mode:

The first controller mode RM1 is set if the resultant correcting variable SGR corresponds to the first correcting variable SG1. The second controller mode RM2 is set if the resultant correcting variable SGR corresponds to the second correcting variable SG2.

To ensure that the transition in dominance from the charge air temperature controller to the coolant temperature limit controller takes place quickly and without any problems, the I component of the coolant temperature limit controller in the first controller mode RM1, i.e., the mode in which the charge air temperature controller is dominant, is set to the value of the first correcting variable SG1. In FIG. 2, this is represented by a corresponding signal path from computing unit 17 to computing unit 18.

FIG. 3 shows a block diagram of the computing unit 17 for automatic charge air temperature control. The input variables are the engine speed nMOT, the power-determining signal ve, which corresponds to a set torque in an engine control system based on torque or to a set injection quantity in an engine control system based on injection quantity, and the actual charge air temperature TLL(IST). The output variable is the first correcting variable SG1, which stands for the bypass coolant flow to be set. A first charge air temperature TLL1 is computed by an engine map 25 from the two input variables engine speed nMOT and power-determining signal ve. The first charge air temperature TLL1 is then filtered by an optional filter 26. The output signal corresponds to the set charge air temperature TLL(SL). At a point A, a charge air temperature control deviation dTLL is computed from the set charge air temperature TLL(SL) and the actual charge air temperature TLL(IST). The charge air temperature control deviation dTLL is the input variable of the charge air temperature controller 27. The charge air temperature controller 27 is preferably realized as a PI controller, but a PID controller or a PIDT1 controller would also be possible. To improve the controller dynamics, a proportional coefficient kp for computing the P component can also be computed as a function of the charge air temperature control deviation dTLL. In this case, the proportional coefficient kp is then computed from the sum of a predetermined, static proportional coefficient and a dynamic proportional coefficient kpDYN1. The dynamic proportional coefficient kpDYN1 is computed by a computing unit 28.

The output variable S1 of the charge air temperature controller 27 is optionally added with an input control value VS at a point B. The sum corresponds to the signal S2. The input control value VS is determined by an input control map 29 as a function of the engine speed nMOT and the power-determining signal ve. The addition at point B represents a disturbance-variable compensation and is meant to improve the dynamics of the open-loop control system. If input control is applied, then the I component of the charge air temperature controller 27 has a lower bound of the negative input control value VS. If no input control is provided, then the I component of the charge air temperature controller 27 has a lower bound of zero. With respect to the upper bound, the I component of the charge air temperature controller 27 is bounded above by the following value (WERT) as a function of the engine speed nMOT:

$$WERT = (nMOT \cdot VMAX)/nNENN \quad \text{(formula 1)}$$

In this formula, nMOT represents the current engine speed, nNENN is a rated engine speed, and VMAX stands for a maximum bypass coolant flow.

A limiter 30 limits the value of the signal S2 below by zero and above according to formula 1. The upper limit determined by the limiter 30 thus corresponds to the label WERT. The output variable of the limiter 30 represents the first correcting variable SG1. It is identical to the set bypass coolant flow. The lower limit of the set bypass coolant flow is zero. The upper limit is computed by formula 1, in which WERT corresponds to the upper limit.

FIG. 4 shows a block diagram of the computing unit 18 for automatic coolant temperature control. The input variables are the engine speed nMOT, the power-determining signal ve, the actual coolant temperature TKM(IST), the first correcting variable SG1, the limiting value GW, and the time-delayed controller mode RMZ, which corresponds to the first controller mode RM1 delayed by a scanning step or to the second controller mode RM2 delayed by a scanning step. The output variable of the computing unit 18 is the second correcting variable SG2, which represents the set bypass coolant flow. A maximum coolant temperature TKM1 is computed by an engine map 31 from the two input variables engine speed nMOT and power-determining signal ve. The maximum coolant temperature, which may not be exceeded, is stored in the engine map 31. The maximum coolant temperature TKM1 is then filtered in a filter 32. A PT1 filter, for example, can be used as the filter 32. The filter constant is greater than or equal to zero in this case. The output variable of the filter 32 is the set coolant temperature TKM(SL). At a point A, a coolant temperature control deviation dTKM is computed from the set coolant temperature TKM(SL) and the actual coolant temperature TKM(IST). The coolant temperature control deviation dTKM is the input variable of the coolant temperature limit controller 33. The coolant temperature limit controller 33 is preferably realized as a PI controller, but a PID controller or a PIDT1 controller would also be possible. To improve the controller dynamics, a proportional coefficient kp for computing the P component can also be computed as a function of the coolant temperature control deviation dTKM. In this case, the proportional coefficient kp is then computed from the sum of a predetermined, static proportional coefficient and a dynamic proportional coefficient kpDYN2. The dynamic proportional coefficient kpDYN2 is computed by a computing unit 34.

To ensure that the transition from the charge air temperature controller 27 to the coolant temperature limit controller 33 takes place quickly and without any problems, the I component of the coolant temperature limit controller 33 is computed as follows:

First, the coolant temperature control deviation dTKM is compared with the limiting value GW. This limiting value GW can be preset, is positive, and has a value of, for example, 2° C. If the coolant temperature control deviation dTKM is greater than or equal to this limiting value GW, then the actual coolant temperature TKM(IST) still differs from the set coolant temperature TKM(SL), i.e., the maximum coolant temperature, by at least 2° C. If the charge air temperature controller 27 was dominant (RM1 set) during the preceding scanning step (FIG. 2: dead-time element 24), then the I component is now set to the value of the first correcting variable SG1, which is computed by the charge air temperature controller 27. If both conditions are not satisfied, then the I component is limited to the value of the label WERT according to formula 1. Accordingly, if the coolant temperature control deviation dTKM is less than the limiting value GW, i.e., less than 2° C., then the I component of the coolant temperature limit controller 33 is no longer set but rather is only limited and thus can run freely. As a result, the transition from the charge air temperature controller 27 to the coolant temperature limit controller 33 and vise versa is free of discontinuities. The smaller the limiting value GW is selected, the faster the transition from the charge air temperature controller 27 to the coolant temperature limit controller 33 occurs. As long as the I component of the coolant temperature limit controller 33 is set, the second correcting variable SG2 of the coolant temperature limit controller 33 differs from the first correcting variable SG1 of the charge air temperature controller 27 only by the P component of the coolant temperature limit controller 33. The smaller the limiting value GW is selected, the smaller the P component of the coolant temperature limit controller 33 is when its I component starts to run freely again, i.e., it is limited instead of set. In this case, the coolant temperature limit controller 33 already takes control at a small negative coolant temperature control deviation dTKM and becomes dominant for the map-controlled thermostatic valve. The transition to the coolant temperature limit controller 33 thus occurs faster, since the coolant temperature limit controller 33 becomes dominant even when the actual coolant temperature TKM(IST) overshoots the set coolant temperature TKM(SL) only slightly.

The output variable of the coolant temperature limit controller 33 is labeled in FIG. 4 with the reference symbol S3. This corresponds to the set bypass coolant flow that is to be set. A limiter 35 then limits this below by zero and above according to formula 1. Therefore, the upper limiting value of the set bypass coolant flow corresponds to the label WERT.

FIG. 5 shows a block diagram of the computing unit 20. The computing unit 20 comprises a first functional block 36 for computing a set thermostat displacement sTH(SL), a second functional block 37 for computing a set voltage U(SL), and a third functional block 38 for converting the set voltage U(SL) to the control signal PWM. The first functional block 36 uses a mathematical function to compute the set thermostat displacement sTH(SL) from the resultant correcting variable SGR as a function of the engine speed nMOT. In a simple embodiment, a linear equation for a decreasing straight line is stored as the mathematical function. A first vertex of the straight line is based on the fact that at the maximum set thermostat displacement sTH(SL), the map-controlled thermostatic valve is completely open, and thus the set bypass coolant flow is zero. A second vertex of the straight line is based on the fact that at a set thermostat displacement sTH(SL) of zero, the map-controlled thermostatic valve is completely closed, and the set bypass coolant flow is at a maximum. The maximum set bypass coolant flow depends on the engine speed nMOT and is computed according to formula 1, in which WERT represents the maximum set bypass coolant flow.

The second functional block 37 converts the set thermostat displacement sTH(SL) to a set voltage U(SL). The physical behavior of the map-controlled thermostatic valve is as follows: If a certain voltage is applied to the map-controlled thermostatic valve at a certain coolant temperature, a certain thermostat displacement is obtained. If the temperature of the coolant changes, or if a different voltage is applied, a different thermostat displacement is obtained. This relationship can be described in the form of a 3D lookup map as: sTH(SL)=f(TKM, U(SL)), where TKM is the coolant temperature, U(SL) is the set voltage, and sTH(SL) is the set thermostat displacement. To automatically control the charge air temperature TLL or the coolant temperature TKM, this lookup map must be inverted. The inverse thermostat lookup map can be described in the following form: U(SL)=f[TKM, sTH (SL)]. In this inverse thermostat lookup map, the set voltage U(SL) is thus computed as a function of the coolant temperature TKM and the set thermostat displacement sTH(SL). The heat input of the heating element into the expanding material element of the map-controlled thermostatic valve depends on the flow rate of the coolant. If the coolant flows faster, then the heat input into the expanding material element is possibly somewhat lower. The flow rate of the coolant in turn depends on the engine speed, since the coolant pump (14 in FIG. 1) is driven by the crankshaft of the internal combustion engine. The inverse thermostat lookup map is denoted by reference number 39. Due to the dependence on engine speed, a speed-dependent correction curve 40 is connected on the output side of the inverse thermostat lookup map 39. The output variable of the second functional block 37 is the set voltage U(SL).

In the third functional block 38, the set voltage U(SL) is assigned a control signal PWM for acting on the map-controlled thermostatic valve. For this purpose, a computing unit 41 converts the set voltage U(SL) to the duty cycle of a PWM signal as a function of the battery voltage UB. The output variable corresponds to the signal PWM1 and is defined in the unit percent. Since the resistance of the heating element in the map-controlled thermostatic valve depends on the temperature of the coolant, and a maximum output power of the output stage in the electronic engine control unit may not be exceeded, the signal PWM1 is limited by a limiter 42 as a function of the battery voltage UB and the coolant temperature TKM. A suitable 3D engine map is stored in the limiter 42. The output signal of the third functional block 38 is the control signal PWM, with which the map-controlled thermostatic valve is controlled.

FIG. 6 shows timing diagrams for the same process. FIG. 6 comprises FIGS. 6A to 6E. The graphs in FIG. 6 show each of the following as a function of time: the charge air temperature TLL (FIG. 6A), the coolant temperature TKM (FIG. 6B), the correcting variables SG (FIG. 6C), the controller mode RM (FIG. 6D), and the control signal PWM, which acts on the map-controlled thermostatic valve (FIG. 6E). In FIG. 6A, the set charge air temperature TLL(SL) is graphed as a broken line, and the actual charge air temperature TLL(IST) is graphed as a solid line. In FIG. 6B, the set coolant temperature TKM(SL) is graphed as a dot-dash line, a temperature reduced by the limiting value GW, for example, 2° C., is graphed as a broken line, and the actual coolant temperature TKM(IST) is graphed as a solid line. In FIG. 6C, the first correcting variable SG1 is graphed as a dot-dash line, the second correcting variable SG2 is graphed as a broken line, and the resultant correcting variable SGR is graphed as a solid line. Since the set thermostat displacement sTH(SL) and the set voltage U(SL) qualitatively follow the same course as the control signal PWM, only the control signal PWM is plotted in FIG. 6E.

Figure 6A:
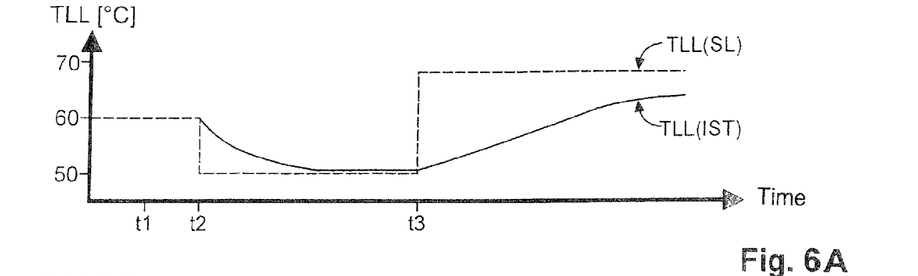
FIG. 6 shows timing diagrams (FIGS. 6A to 6E).
Figure 6B:
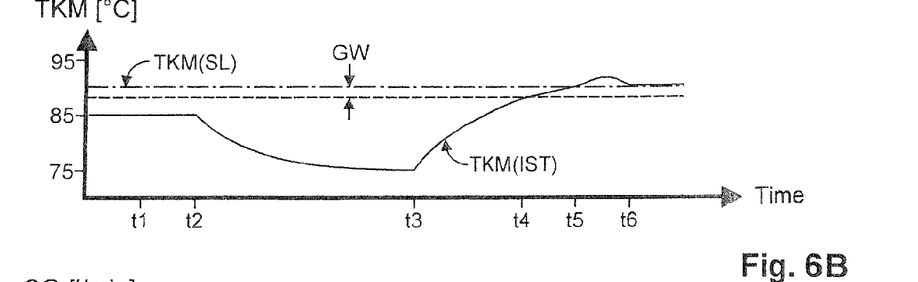
Figure 6C:
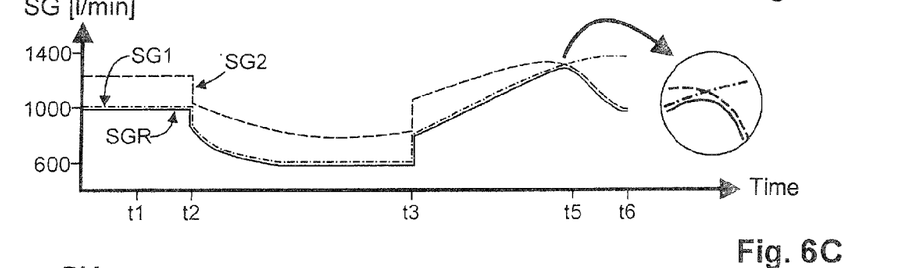
Figure 6D:
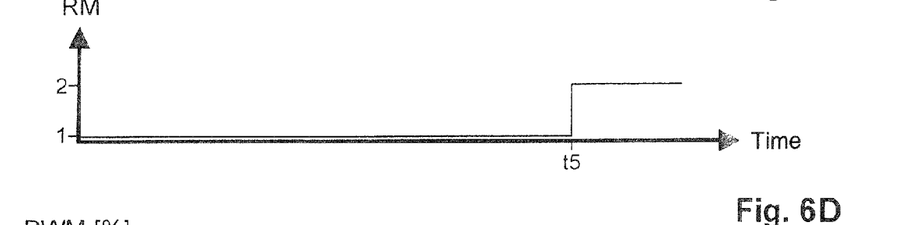
Figure 6E:
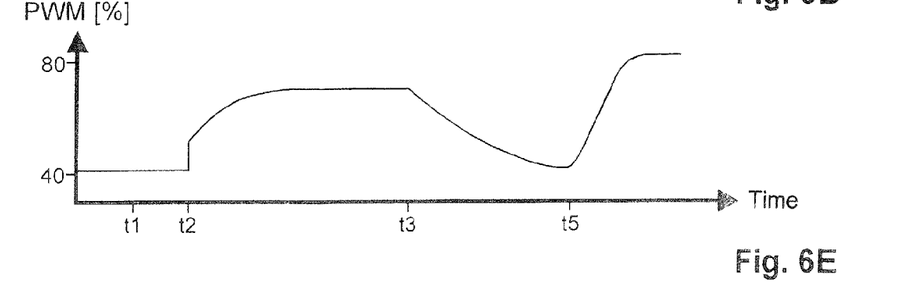

At time t1, the whole system is in the steady state at a set charge air temperature TLL(SL) and an actual charge air temperature TLL(IST) of 60° C. The actual coolant temperature TKM(IST) is 85° C. and is below the set coolant temperature TKM(SL) of 90° C., which represents the maximum permissible coolant temperature. The charge air temperature controller is thus dominant, and the first controller mode RM1 is set as the controller mode RM (FIG. 6D). Therefore, the resultant correcting variable SGR follows the same course as the first correcting variable SG1. The I component of the coolant temperature limit controller is set to the value of the first correcting variable SG1. However, due to the coolant temperature control deviation, the second correcting variable SG2 has a higher value than the first correcting variable SG1.

At time t2, the set charge air temperature TLL(SL) changes suddenly from 60° C. to 50° C. As a consequence of this, the first correcting variable SG1, the second correcting variable SG2, and the resultant correcting variable SGR become smaller. A decreasing resultant correcting variable SGR causes an increasing set thermostat displacement sTH(SL), an increasing set voltage U(SL), and an increasing control signal PWM. An increasing control signal PWM causes the map-controlled thermostatic valve to be operated in the direction of its maximum opening, which causes a greater flow of coolant through the recooler. Due to the now lower temperature of the coolant flow, the actual charge air temperature TLL(IST) drops and approaches the set charge air temperature TLL(SL). The actual coolant temperature TKM(IST) also drops to a lower level. The first controller mode RM1 continues to be set as the controller mode RM.

At time t3, the set charge air temperature TLL(SL) suddenly jumps to 67° C. This causes the first correcting variable SG1 and thus the resultant correcting variable SGR, as well as the second correcting variable SG2 to increase. The control signal PWM is reduced accordingly. The actual charge air temperature TLL(IST) and the actual coolant temperature TKM(IST) increase. At time t4, the actual coolant temperature TKM(IST) reaches a value of 88° C. Since the limiting value GW of the coolant temperature control deviation dTKM is preset at 2° C., the I component of the coolant temperature limit controller is now no longer set to the first correcting variable SG1. Instead, since the internal combustion engine is being operated at its rated speed, the I component is now limited to the maximum bypass coolant flow VMAX, which in the present example is 1350 liters/minute. At time t5, the actual coolant temperature TKM(IST) then exceeds the set coolant temperature TKM(SL), before the actual charge air temperature TLL(IST) reaches its setpoint value TLL(SL). This leads to a reduction of the second correcting variable SG2. The first correcting variable SG1 of the charge air temperature controller, on the other hand, continues to rise, since the charge air temperature control deviation dTLL is positive. This finally causes the second correcting variable SG2 of the coolant temperature limit controller to become smaller than the first correcting variable SG1 (see the enlarged section in FIG. 6C). When this occurs, the coolant temperature limit controller becomes dominant. The controller mode is set to the second controller mode RM2 (FIG. 6D). The resultant correcting variable SGR and the second correcting variable SG2 are now identical and continue to fall until the actual coolant temperature TKM(IST) has reached its set coolant temperature TKM(SL) of 90° C. This occurs at t6. Since the coolant temperature limit controller is now dominant, the actual charge air temperature TLL(IST) no longer reaches the set charge air temperature TLL(SL). The control signal PWM reaches a higher level, which leads to an increase in cooling capacity.

Figure 7:
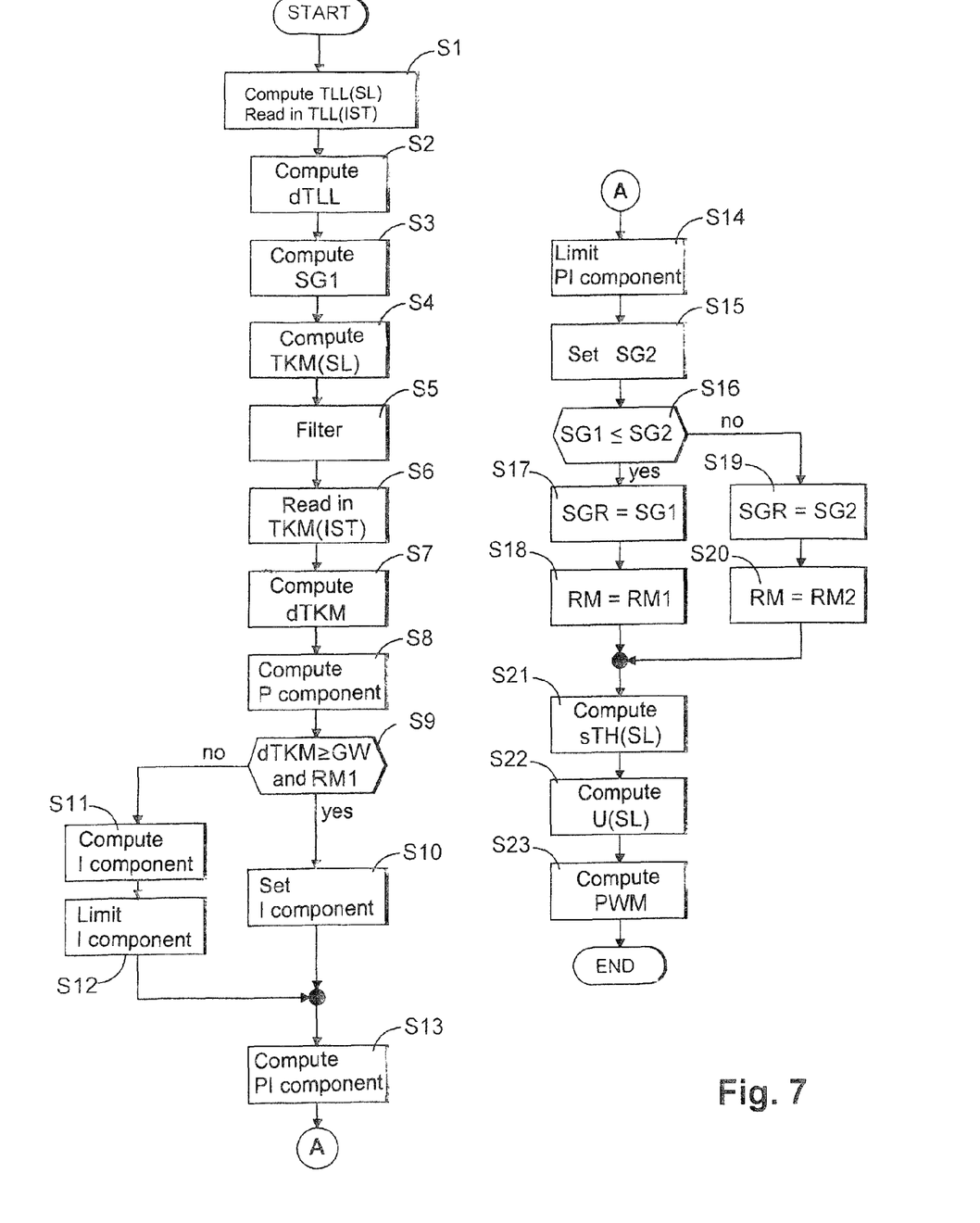
FIG. 7 shows a program flowchart.

FIG. 7 shows a program flowchart. At S1 the set charge air temperature TLL(SL) is computed as a function of the engine speed and the power-determining signal, and the charge air temperature TLL (raw values) is acquired and filtered. The result is the actual charge air temperature TLL(IST). The charge air temperature control deviation dTLL is then computed at S2. The first correcting variable SG1 is then computed on the basis of the charge air temperature control deviation dTLL, the input control value (VS in FIG. 3), and a limitation performed by a limiter (30 in FIG. 3). At S4 a maximum permissible coolant temperature, which is set as the set coolant temperature TKM(SL), is computed by a lookup map as a function of the engine speed and the power-determining signal. At S5 the set coolant temperature TKM (SL) is then filtered. At S6 the actual coolant temperature TKM(IST) is read in, and at S7, the coolant temperature control deviation dTKM is computed from the difference between the set value and the actual value. At S8 the P component of the coolant temperature limit controller is computed. At S9 the coolant temperature control deviation dTKM is compared with the limiting value GW, for example, 2° C. If the coolant temperature control deviation dTKM has not yet fallen below this limiting value, and if the first controller mode RM1 is set (interrogation result at S9: yes), then at S10 the I component of the coolant temperature limit controller is set to the value of the first correcting variable SG1, and the program flows to S13. If the condition at S9 is not satisfied, then the I component of the coolant temperature limit controller is computed at S11 and limited to the label WERT at S12 according to the aforementioned formula 1, and the program flows to S13.

At S13 the PI component of the coolant temperature limit controller is computed by adding the P component and the I component with each other. The PI component is then limited at S14 according to formula 1, in which the label WERT represents the limiting value. The value of the limited PI component corresponds to the second correcting variable SG2, S15. At S16 the value of the first correcting variable SG1 and the value of the second correcting variable SG2 are compared with each other by the minimum value selector (19 in FIG. 2). The controller whose correcting value represents the smaller value is the one which is dominant for the map-controlled thermostatic valve. If the first correcting variable SG1 is less than or equal to the second correcting variable SG2 (interrogation result at S16: yes), then at S17 the resultant correcting variable SGR is set to the value of the first correcting variable SG1. The first controller mode RM1 is then set at S18, and the program flows to S21. If, on the other hand, the first correcting variable SG1 is greater than the second correcting variable SG2 (interrogation result at S16: no), then at S19 the resultant correcting variable SGR is set to the value of the second correcting variable SG2, the second controller mode RM2 is set at S20, and the program flows to S21. At S21 the set thermostatic displacement sTH(SL) is computed from the resultant correcting variable SGR, at S22 the set voltage U(SL) is computed by the computing unit (20 in FIG. 2), and at S23 the control signal PWM is computed. The program flow ends here.

The advantages can be summarized as follows:

In transient events, for example, engine run-ups, the coolant temperature stays below a predetermined maximum value, here: the set coolant temperature, so that the internal combustion engine is protected.

The coolant temperature limit controller intervenes with a correction only if the coolant temperatures rises to an impermissible level.

Since at all times only one controller is dominant, a stable closed-loop control system is realized.

Due to the setting of the I component of the coolant temperature limit controller to the first correcting variable when the charge air temperature controller is dominant, a rapid change in dominance from the charge air temperature controller to the coolant temperature limit controller is made possible.

Although the present invention has been described in relation to particular embodiments thereof, many other variations and modifications and other uses will become apparent to those skilled in the art. It is preferred, therefore, that the present invention be limited but by the specific disclosure herein, but only by the appended claims.

The invention claimed is:

1. A method for automatically controlling an internal combustion engine, comprising the steps of:
setting, in a first controller mode (RM1), a charge air temperature controller as dominant for a map-controlled thermostatic valve;
setting in a second controller mode (RM2), a coolant temperature limit controller as dominant for the map-controlled thermostatic valve;
dividing a coolant flow upstream of a recooler into a recooler coolant flow and a bypass coolant flow as a function of a position of the map-controlled thermostatic valve; and
determining temperature of the charge air cooler coolant flow downstream of the recooler from combined fractions of the recooler coolant flow and the bypass coolant flow for controlling charge air temperature (TLL) or coolant temperature (TKM).

2. The method in accordance with claim 1, further including determining a first correcting variable (SG1) from a charge air temperature control deviation (dTLL) by the charge air temperature controller, computing a second correcting variable (SG2) from a coolant temperature control deviation (dTKM) by the coolant temperature limit controller, setting the controller whose correcting variable (SG1, SG2) shows a smaller value as dominant for the map-controlled thermostatic valve, and setting a resultant correcting variable (SGR) to the value of the correcting variable (SG1, SG2) of the dominant controller.

3. The method in accordance with claim 2, including limiting the first correcting variable (SG1) and the second correcting variable (SG2) to a maximum value that depends on engine speed.

4. The method in accordance with claim 2, including computing the charge air temperature control deviation (dTLL) from a set charge air temperature (TLL(SL)) and an actual charge air temperature (TLL(IST)), and computing the set charge air temperature (TLL(SL)) as a function of engine speed (nMOT) and a power-determining signal (ve).

5. The method in accordance with claim 2, including computing the coolant temperature control deviation (dTKM) from a set coolant temperature (TKM(SL)) and an actual coolant temperature (TKM(IST)), and computing the set coolant temperature (TKM(SL)) as a function of engine speed (nMOT) and a power-determining signal (ve).

6. The method in accordance with claim 2, including setting an I component of the coolant temperature limit controller to the value of the first correcting variable (SG1) if the coolant temperature control deviation (dTKM) is greater than or equal to a limiting value (GW) and the first controller mode (RM1) was set during a preceding scanning step.

7. The method in accordance with claim 6, including computing the I component of the coolant temperature limit controller as a function of the coolant temperature control deviation (dTKM) and limiting the I component as a function of engine speed (nMOT) if the coolant temperature control deviation (dTKM) is less than the limiting value (GW) or the second controller mode (RM2) was set during the preceding scanning step.

8. The method in accordance with claim 2, wherein a control signal (PWM) for acting on the map-controlled thermostatic valve is determined from the resultant correcting variable (SGR) by a computing unit, and the position of the map-controlled thermostatic valve is determined by the control signal (PWM).

9. The method in accordance with claim 8, wherein, in the computing unit, a set thermostat displacement (sTH(SL)) is assigned to the resultant correcting variable (SGR) by a first functional block, the set thermostat displacement (sTH(SL)) is converted to a set voltage (U(SL)) by a second functional block, and the control signal (PWM) is computed from the set voltage (U(SL)) by a third functional block.

10. The method in accordance with claim 9, including computing the set voltage (U(SL)) from the set thermostat displacement (sTH(SL)) by an inverse thermostat lookup map and a correction curve, and determining the control signal (PWM) from the set voltage (U(SL)) by a computing unit and a limiter.

* * * * *